(12) United States Patent
Tazzia

(10) Patent No.: US 6,190,523 B1
(45) Date of Patent: Feb. 20, 2001

(54) ELECTROCOAT COATING COMPOSITION AND PROCESS FOR ELECTROCOATING A SUBSTRATE

(75) Inventor: Charles L. Tazzia, Detroit, MI (US)

(73) Assignee: BASF Corporation, Southfield, MI (US)

( * ) Notice: Under 35 U.S.C. 154(b), the term of this patent shall be extended for 0 days.

(21) Appl. No.: 09/357,456

(22) Filed: Jul. 20, 1999

(51) Int. Cl.$^7$ .................................................. C25D 13/04
(52) U.S. Cl. ......................... 204/484; 204/493; 204/498; 523/409; 523/412
(58) Field of Search .................................. 204/484, 492, 204/493, 498; 523/409, 412

(56) References Cited

U.S. PATENT DOCUMENTS

| | | |
|---|---|---|
| 3,230,162 | 1/1966 | Gilchrist . |
| 3,679,615 | 7/1972 | Gilchrist ................................ 260/3.3 |
| 4,081,416 | 3/1978 | Berenschot et al. .................. 260/850 |
| 4,096,105 | 6/1978 | McGinniss ........................ 204/181 C |
| 4,882,090 | 11/1989 | Batzill et al. ......................... 524/495 |
| 4,988,420 | 1/1991 | Batzill et al. ...................... 204/181.1 |
| 4,997,865 * | 3/1991 | Scherping et al. .................... 523/409 |
| 5,389,406 | 2/1995 | Doebler et al. ................... 204/181.1 |

* cited by examiner

Primary Examiner—Kishor Mayekar
(74) Attorney, Agent, or Firm—Anna M. Budde

(57) ABSTRACT

An electrocoat coating composition includes an anionic addition polymer latex and a water-insoluble crosslinking resin that is dispersed with an anionic dispersing resin.

23 Claims, No Drawings

ELECTROCOAT COATING COMPOSITION AND PROCESS FOR ELECTROCOATING A SUBSTRATE

FIELD OF THE INVENTION

The invention concerns anodic electrocoat coating compositions and processes for electrocoating substrates.

BACKGROUND OF THE INVENTION

Electrodeposition coating compositions and methods are widely used in industry today. One of the advantages of electrocoat compositions and processes is that the applied coating composition forms a uniform and contiguous layer over a variety of conductive substrates regardless of shape or configuration. This is especially advantageous when the coating is applied as an anticorrosive coating onto a substrate having an irregular surface, such as a motor vehicle body. The even, continuous coating layer on all portions of the metallic substrate provides maximum anticorrosion effectiveness.

Electrocoat baths usually include an aqueous dispersion of a principal film-forming resin, such as an acrylic or epoxy resin, having ionic stabilization. For automotive or industrial applications for which hard electrocoat films are desired, the electrocoat compositions are formulated to be curable compositions. This is usually accomplished by including in the bath a crosslinking agent that can react with functional groups on the principal resin under appropriate conditions (such as with the application of heat) and thus cure the coating. During electrodeposition, coating material containing an ionically-charged resin is deposited onto a conductive substrate by submerging the substrate in an electrocoat bath having dispersed therein the charged resin, and then applying an electrical potential between the substrate and an electrode of opposite charge. The charged coating material migrates to and deposits on the conductive substrate. The coated substrate is then heated to cure the coating.

Typically, the crosslinker resin does not carry a charge. In order to have the crosslinker resin disperse in the aqueous electrocoat coating bath and migrate to the substrate when the electrical potential is applied, the crosslinker resin is blended with the ionically-charged principal resin to form an organic phase which is then dispersed in the aqueous phase. The charged principal resin then carries the crosslinker that it disperses to the substrate, where the crosslinker is deposited along with the resin. For this to happen, it is important that the crosslinker remain associated with the charged resin. Thus, a crosslinker that is water soluble will dissolve in the aqueous phase will not electrodeposit during the electrocoating process and will not be suitable for preparing curable electrocoat coating films.

SUMMARY OF THE INVENTION

I have now invented an electrocoat coating composition including, in an aqueous medium, an anionic, emulsion-polymerized addition polymer, a water-insoluble crosslinking resin, and an anionic dispersing resin for dispersing the crosslinking resin.

The present invention further provides a method of coating a conductive substrate. In the method of the invention, a conductive substrate is immersed in an electrodeposition coating composition. The electrodeposition coating composition includes, in an aqueous medium, an emulsion-polymerized anionic addition polymer and a water-insoluble curing agent dispersed along with an anionic dispersing resin. Then, a potential of electric current is applied between a cathode and the conductive substrate (which is then the anode) to deposit a coating layer onto the conductive substrate. The deposited coating layer is cured by reaction between the anionic latex polymer and the curing agent.

In another aspect of the invention, a conductive substrate is electrocoated with a first layer of a first electrocoat coating composition containing a conductive pigment. The electrodeposited first layer is then cured to provide a conductive coating layer. Then, a second layer of a second electrocoat coating composition is applied to the substrate and cured. the electrocoat coating composition of the invention is applied in a second electrocoat coating layer and cured. At least one of the first electrocoat coating composition and the second electrocoat coating composition is an electrocoat coating composition according to the present invention that includes, in an aqueous medium, an anionic, emulsion-polymerized addition polymer, a water-insoluble crosslinking resin, and an anionic dispersing resin for dispersing the crosslinking resin.

DETAILED DESCRIPTION OF THE INVENTION

The electrocoat composition of the invention is an aqueous dispersion that includes at least an anionic addition polymer latex as a principal film-forming resin, a curing agent that is substantially water insoluble, and an anionic dispersing resin that disperses the curing agent. The anionic addition polymer latex is preferably polymerized with at least one acrylic monomer. When used herein, "acrylic" is used to encompass not only acrylic monomers but also methacrylic monomers and the like.

Anionic addition polymers, including, without limitation, acrylic polymers, contain acid groups that may be incorporated by polymerization of acid-containing monomers, especially carboxylic acid-containing monomers such as, without limitation, acrylic acid, methacrylic acid, crotonic acid, maleic anhydride and the acid, maleic acid, to which it hydrolyzes; itaconic anhydride and itaconic acid; monoalkyl maleates, isocrotonic acid, vinylacetic acid, or other polymerizable acid monomers or anhydride monomers.

The monomers used to prepare the emulsion copolymer also include at least one group suitable for crosslinking. While the acid group that is used to electrodeposit the resin may also be used as a functional site for crosslinking, if the acid functionality is too high it may cause problems such as in deposition and/or increased viscosity of the emulsion. Preferably, another monomer having a crosslinkable functionality is copolymerized in forming the emulsion copolymer. Alternatively, a crosslinkable functionality can be reacted onto the addition polymer. Suitable crosslinkable functionalities include, without limitation, hydroxyl, carboxylic acid, carbamate, and urea functionalities.

Useful hydroxyl-functional ethylenically unsaturated monomers include, without limitation, hydroxyethyl methacrylate, hydroxyethyl acrylate, hydroxypropyl acrylate, hydroxypropyl methacrylate, hydroxybutyl acrylate, hydroxybutyl methacrylate, vinyl acetate (which hydrolyzes to the alcohol), the reaction product of methacrylic acid with styrene oxide, and so on. Preferred hydroxyl monomers are methacrylic or acrylic acid esters in which the hydroxyl-bearing alcohol portion of the compound is a linear or branched hydroxy alkyl moiety having from 1 to about 8 carbon atoms.

The monomer bearing the crosslinkable functional group such as a hydroxyl group and the monomer bearing the acid group for salting may be polymerized with one or more other ethylenically unsaturated monomers. Such monomers for copolymerization are known in the art. Illustrative examples include, without limitation, alkyl esters of acrylic or methacrylic acid, e.g., methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, amyl acrylate, amyl methacrylate, isoamyl acrylate, isoamyl methacrylate, hexyl acrylate, hexyl methacrylate, 2-ethylhexyl acrylate, decyl acrylate, decyl methacrylate, isodecyl acrylate, isodecyl methacrylate, dodecyl acrylate, dodecyl methacrylate, cyclohexyl acrylate, cyclohexyl methacrylate, substituted cyclohexyl acrylates and methacrylates, 3,5,5-trimethylhexyl acrylate, 3,5,5-trimethylhexyl methacrylate, the corresponding esters of maleic, fumaric, crotonic, isocrotonic, vinylacetic, and itaconic acids, and the like; and vinyl monomers such as styrene, t-butyl styrene, alpha-methyl styrene, vinyl toluene and the like. Other useful polymerizable co-monomers include, for example, alkoxyethyl acrylates and methacrylates, acryloxy acrylates and methacrylates, and compounds such as acrylonitrile, methacrylonitrile, acrolein, and methacrolein. Combinations of these are usually employed. Small amounts of difunctional monomers may be included, such as acrylate or methacrylate [herein denoted as (meth)acrylate] esters of polyols such as 1,4-butanediol di(meth)acrylate, 1.6-hexanediol di(meth)acrylate, neopentyl glycol di(meth) acrylate, trimethylol propane tri(meth)acrylate, tetramethylol methane tetra(meth)acrylate, pentaerythritol tetra(meth) acrylate, dipentaerythritol penta(meth)acrylate, dipentaerythritol hexa(meth)acrylate, alkylene glycol di(meth)acrylates and polyalkylene glycol di(meth) acrylates, such as ethylene glycol di(meth)acrylate, butylene glycol di(meth)acrylate, diethylene glycol di(meth)acrylate, triethylene glycol di(meth)acrylate, and polyethylene glycol di(meth)acrylate; divinylbenzene, allyl methacrylate, diallyl phthalate, diallyl terephthalate, and the like, singly or in combinations of two or more.

It is preferred to include up to about 5% acid monomer by weight in the polymerization monomers. In a more preferred embodiment, from about 1% to about 4% acid monomer by weight is included. The acid equivalent weight of the anionic resin can range from about 1000 grams per equivalent to about 10,000 grams per equivalent, and preferably from about 1500 grams per equivalent to about 6000 grams per equivalent. The crosslinking group equivalent weight of the resins, if they have hydroxyl, carbamate, or urea groups, is generally between about 150 grams per equivalent and 1500 grams per equivalent.

The anionic addition polymer latex used as principal resin of the inventive compositions is polymerized by emulsion polymerization. The polymerization may be carried out in the presence of at least one water soluble initiator compound, for example, without limitation, ammonium persulfate. Although redox initiators are known for carrying out emulsion polymerization, soluble iron salts are preferably avoided. Preferably, a chain transfer agent is included. Examples of suitable chain transfer agents include, without limitation, octyl mercaptan, dodecyl mercaptan, halogenated hydrocarbons, diacetone alcohol and similar alcohols, the dimer of α-methyl styrene, mixtures of oil-soluble and water-soluble initiators, and combinations of these. It is preferred to include at least about 0.8% based upon the total weight of monomer polymerized. It is also preferred to use up to about 5% of a chain transfer agent, based upon the total weight of monomer polymerized. With increasing amounts of chain transfer agent, it is possible to minimize the amount of initiator added. This is beneficial because fewer conductive species are introduced which might cause the conductivity of the electrocoat bath to be too high. In a preferred embodiment, from about 1% up to about 3% of a mercaptan is included, based upon the total weight of monomer polymerized.

The polymerization may be carried out by adding the monomers and chain transfer agent to an aqueous medium containing an anionic surfactant to form a pre-emulsion. The initiator may be dissolved in water and added to the pre-emulsion or added to a reaction vessel in a separate feed. The pre-emulsified monomers, chain transfer agent, and initiator are added to a reaction vessel containing water, where the emulsion polymerization is then carried out.

The acid groups of the acid-functional emulsion resin are salted with ammonia or an amine. Suitable amines include, without limitation, aminomethylpropanol, dimethylethanolamine, and triethylamine, diisopropanolamine, methyldiethanolamine, aminopropyl morpholine, other morpholine compounds, and so on, as well as combinations of these. The salting amine is preferably added to the emulsion polymer after the polymerization reaction. The resin may be fully neutralized; however, partial neutralization is usually sufficient to render the resin electrodepositable. By "partial neutralization" we mean that at least one, but less than all, of the acid groups on the resin are neutralized. By saying that the anionic resin is at least partially neutralized, we mean that at least one of the acid groups of the resin is neutralized, and up to all of such groups may be neutralized. The optimum degree of neutralization for a particular resin can readily be determined by one of ordinary skill in the art through straightforward experimentation. Typically, the resin is at least about 20% neutralized and up to fully neutralized, preferably from about 40% neutralized to about 60% neutralized.

The electrocoat coating composition of the invention further includes a water-insoluble curing agent. The curing agent is reactive with the crosslinking functionality of the anionic latex polymer. The type of curing agent included depends upon the reactive crosslinking functionality of the anionic latex polymer. Preferred curing agents for hydroxyl, carbamate, and urea functional polymers include water-insoluble amino resins, including urea formaldehyde and melamine formaldehyde resins such as butylated melamines formaldehyde resins, and blocked isocyanate resins. Blocked isocyanate resins include blocked polyisocyanate compounds and blocked oligomers or prepolymers of polyisocyanate compounds including, without limitation, blocked isocyanurates, blocked biurets, blocked allophanates, and blocked isocyanate-functional prepolymers such as the reaction product of one mole of a triol with three moles of a diisocyanate. Illustrative examples of useful polyisocyanates compounds that can be blocked or used to prepare blocked isocyanate oligomers or prepolymers include, without limitation, isophorone diisocyanate, hexamethylene diisocyanate, toluene diisocyanate, methylene diphenyl diisocyanate, methylene dicyclohexyl diisocyanate, 2-methyl-1,5-pentane diisocyanate, 2,2,4-trimethyl-1,6-hexane diisocyanate, and 1,12-dodecane diisocyanate. Typical blocking agents for the isocyanate groups are oximes, lactams, malonic esters, secondary and tertiary monoalcohols, C—H acidic compounds such as dialkylmalonates, acetyl acetone, alkyl esters of acetoacetic acid, oximes, phenols such as phenol or o-methylphenol, N-alkylamides, pyrazoles, imides, or alkali metal bisulphites.

Preferred curing agents when the acid functionality of the anionic latex polymer is used for crosslinking include epoxide-functional epoxy resins and acrylic resins, as well as monomeric polyfunctional epoxide compounds such as triglycidyl isocyanurate, polyoxazolines, and polydioxanes. Other curing agents may be suitable, depending upon the crosslinkable functionality of the anionic latex.

The crosslinker is incorporated by mixing with an acid-functional dispersing resin to form a resin mixture, at least partially neutralizing the dispersing resin with ammonia or an amine, and then dispersing the resin mixture in an aqueous medium. The aqueous medium may be water or water and a cosolvent. Suitable anionic resins include acrylic resins that are solution polymerized in organic medium and include at least one acid group, especially carboxylic acid groups. Acid-functional polyesters and polyurethanes are also desirable as the dispersible resin used to incorporate the crosslinker. It is also possible to prepare acid functional epoxy resins or other resins that can be used to disperse the crosslinker.

In one preferred embodiment of the invention, the dispersing resin is a carboxylic acid-functional acrylic resin. The acrylic resin preferably has an equivalent weight of from about 200 grams per equivalent to about 1000 grams per equivalent. The acrylic resin preferably has a weight average molecular weight of from about 5000 to about 50,000.

After the acid-functional resin is mixed with the crosslinker and then salted with ammonia or an amine compound, such as any of those mentioned above in connection with the principal resin. Preferably, the salting amine is mixed with the resin and the crosslinking agent before the resin is dispersed in the water. The acid-functional resin is neutralized to a sufficient degree to disperse the mixture in an aqueous medium. Typically, the dispersing resin is at least about 20% neutralized before dispersing. Preferably, the dispersing resin is from about 40% neutralized to completely (100%) neutralized, more preferably from about 40% neutralized to about 80% neutralized, and even more preferably at least about 50% neutralized before dispersing. The salted mixture of dispersing resin and crosslinker resin may be dispersed in the latex of the principle resin or may be pre-dispersed to form a dispersion of the dispersing resin and crosslinker which is then added to the principal resin latex in forming the electrocoat coating composition. Because the curing agent or crosslinker resin is water-insoluble, it remains associated with the anionic dispersing resin in the dispersion and is electrodeposited with the anionic dispersing resin during the electrocoating process.

The electrodeposition coating composition may further contain conventional pigments such as titanium dioxide, ferric oxide, carbon black, aluminum silicate, precipitated barium sulfate, aluminum phosphomolybdate, strontium chromate, basic lead silicate or lead chromate. The pigments may be dispersed using an anionic grind resin (dispersible resin with acid groups that can be neutralized with ammonia or an amine) or a pigment dispersant. The pigment-to-resin weight ratio in the electrocoat bath can be important and should be preferably less than 50:100, more preferably less than 40:100, and usually about 10 to 30:100. Higher pigment-to-resin solids weight ratios have been found to adversely affect coalescence and flow. Usually, the pigment is 10–40 percent by weight of the nonvolatile material in the bath. Preferably, the pigment is 15 to 30 percent by weight of the nonvolatile material in the bath. Any of the pigments and fillers or extenders generally used in electrocoat primers may be included. Extenders such as clay and pigments such as anti-corrosion pigments are commonly included.

Besides water, the aqueous medium of an electrocoat composition may also contain a coalescing solvent. Useful coalescing solvents include hydrocarbons, alcohols, esters, ethers and ketones. The preferred coalescing solvents include alcohols, polyols and ketones. Specific coalescing solvents include propylene glycol, and derivatives of propylene glycol such as the alkyl ethers or phenyl ether of propylene glycol, monoalkyl ethers of ethylene glycol such as the monomethyl, monoethyl, monopropyl, monobutyl, and monohexyl ethers of ethylene glycol; dialkyl ethers of ethylene glycol such as ethylene glycol dimethyl ether; or diacetone alcohol. A small amount of a water-immiscible organic solvent such as xylene, toluene, methyl isobutyl ketone or 2-ethylhexanol may be added to the mixture of water and the water-miscible organic solvent. The amount of coalescing solvent is not critical and is generally between about 0 to 15 percent by weight, preferably about 0.5 to 5 percent by weight based on total weight of the resin solids.

The electrodeposition coating compositions used in the invention can contain optional ingredients such as dyes, flow control agents, plasticizers, catalysts, wetting agents, surfactants, UV absorbers, hindered amine light stabilizer compounds, antioxidants, defoamers and so forth. Plasticizers are optionally included to promote flow or modify plating properties. Plasticizers can be used at levels of up to 15 percent by weight resin solids.

Curing catalysts can be used in the coating composition. Typical examples for catalyzing a curing reaction involving an isocyanate crosslinker are, without limitation, tin and bismuth compounds including dibutyltin dilaurate, dibutyltin oxide, and bismuth octoate. When used, catalysts are typically present in amounts of about 0.05 to 2 percent by weight tin based on weight of total resin solids. When the curing agent is an aminoplast resin, an acid catalyst may be included. Examples of acid catalysts that can be used are sulfonic acid catalysts, such as p-toluenesulfonic acid, dinonylnaphthalenesulfonic acid, and dodecylbenzenesulfonic acid, and phenyl acid phosphate.

The electrocoat bath generally has an electroconductivity from 800 micromhos to 6000 micromhos. When conductivity is too low, it is difficult to obtain a film of desired thickness and having desired properties. On the other hand, if the composition is too conductive, problems such as the dissolution of substrate or counter electrode in the bath, uneven film thickness, rupturing of the film, or poor resistance of the film to corrosion or water spotting may result.

The coating composition according to the present invention is electrodeposited onto a substrate and then cured to form a coated article. The electrodeposition of the coating preparations according to the invention may be carried out by any of a number of processes known to those skilled in the art. The electrocoat coating composition may be applied on any conductive substrate, such as steel, copper, aluminum, zinc, brass, tin nickel, chromium, or other metals or metal alloys, preferably to a dry film thickness of 10 to 35 $\mu$m. The substrate may have a pretreatment such as a phosphate or chromate treatment. The substrate may also have a conductive coating layer, for example an electrodeposited coating containing a conductive pigment that has been dried and/or cured to an extent sufficient to develop the conductivity of the deposited coating. If not cured or fully cured, the first layer containing the conductive pigment is cured or fully cured after the second electrodeposited layer is applied, along with the second electrodeposited layer. The article coated with the composition of the invention may be a metallic automotive part or body. After application, the coated article is removed from the bath and rinsed with deionized water. The coating may be cured under appropriate conditions, for example by baking at from about 240° F. to about 375° F. for between about 15 and about 60 minutes.

The electrocoat coating composition may also be used as a second electrocoat coating applied over a conductive electrocoated substrate or as the first, conductive electrocoat layer. Two-coat electrocoating methods are described in Batzill et al., U.S. Pat. Nos. 4,882,090 and 4,988,420, both of which are incorporated herein by reference. In a two-electrocoating process, the first electrodeposited coating layer includes a conductive pigment, preferably conductive carbon black. The first deposited layer may be a cathodic electrocoat composition, as is described in the Batzill patents, or may be an anodically depositable electrocoat composition having salted acid groups, as in the case of the anodic composition of the present invention. The conductive pigment may be included in an amount of about 0.1% or more, based on total weight of nonvolatile material of the electrocoat composition. Up to about 7% of conductive pigment may be included based on total weight of nonvolatile material of the electrocoat composition. For example, conductive carbon black may be included in an amount of from about 1.5% to about 5.1% by weight of the nonvolatile material of the present electrocoating composition when used to form the first, conductive layer in a two-coat electrocoating process. When the electrodeposited layer containing the conductive pigment is dried or cured, it provides a conductive layer upon which the electrocoat composition of the invention may be applied.

When the electrocoat composition of the invention is coated directly over a metal substrate, it is preferred for the principal resin to have a higher $T_G$ than when the electrocoat composition deposits a second electrocoat layer onto a substrate. When used as the first or only layer of electrocoat coating, the principal resin may include monomers have higher $T_G$ homopolymer, such as styrene, methacrylic acid, and methyl methacrylate. In the case of a two-layer electrocoat primer, the electrocoat composition of the invention forms the second layer and the acrylic latex preferably has a $T_G$ of from about −40° C. to about 90° C., more preferably from about −10° C. to about 40° C.

Following electrodeposition, the applied coating is usually cured before other coatings, if used, are applied. When the electrocoat layer is used as a primer in automotive applications, one or more additional coating layers, such as a primer-surfacer, color coat, and, optionally, a clearcoat layer, may be applied over the electrocoat layer. The color coat may be a topcoat enamel. In the automotive industry, the color coat is often a basecoat that is overcoated with a clearcoat layer. The primer surfacer and the topcoat enamel or basecoat and clearcoat composite topcoat may be ether waterborne or solventborne. The coatings can be formulated and applied in a number of different ways known in the art. For example, the resin used can be an acrylic, a polyurethane, or a polyester. Typical topcoat formulations are described in U.S. Pat. Nos. 4,791,168, 4,414,357, 4,546,046, 5,373,069, and 5,474,811. The coatings can be cured by any of the known mechanisms and curing agents, such as a melamine or blocked isocyanate.

The invention is further described in the following example. The example is merely illustrative and does not in any way limit the scope of the invention as described and claimed. All parts are parts by weight unless otherwise noted.

Synthesis of Acrylic Emulsion

A monomer emulsion is prepared by charging a container with a mixture of 408.7 grams of deionized water and 28.0 grams of ABEX EP-110 (an ammonium salt of sulfated nonylphenol ethoxylate obtained from Rhodia Corp.) In a separate container, a monomer mixture is produced using 214.8 grams of methyl methacrylate, 214.8 grams of n-butyl acrylate, 156.5 grams of hydroxyethyl methacrylate, 18.4 grams of acrylic acid, and 9.2 grams of octanethiol. The water mixture is stirred with medium agitation while the monomer mixture is slowly poured into the water mixture to make a monomer pre-emulsion. A solution of 1.84 grams of ammonium persulfate in 12.3 grams of deionized water is then added to the monomer pre-emulsion.

A suitable reaction vessel was charged with 568.2 grams of deionized water and 3.1 grams of ABEX EP-110. The contents of the reaction vessel was heated to 80° C. with medium agitation and under a nitrogen blanket. The monomer pre-emulsion is pumped into the reaction vessel at a steady rate over a period of three hours, maintaining the contents of the reaction vessel at 80° C. to 82° C. The pump was flushed with 20 grams of deionized water. The temperature of the reaction mixture was maintained for two additional hours at 80° C. to 82° C. The reaction mixture was then cooled to 40° C. and a solution of 10 grams of 2-amino-2-methyl-1-propanol (95%) in 90 grams of deionized water was added slowly.

Preparation of Curing Agent Emulsion

A mixture of 52.3 grams of 2-amino-2-methyl-1-propanol (95%) in 209.1 grams of deionized water is added to a mixture of 2507 grams of a solution acrylic resin having an acid number of 48 mg KOH/gram nonvolatile (about 69.5% nonvolatiles in propylene glycol monopropyl ether) and 3440 grams of a butylated melamine. The resin and water are mixed until homogenous. The resin and water mixture is then added slowly to 5791 grams of deionized water with constant stirring to produce an emulsion.

Preparation of Pigment Paste

The solution acrylic resin used in preparing the curing agent emulsion (acid number of 48 mg KOH/gram nonvolatile, about 69.5% nonvolatiles in propylene glycol monopropyl ether) was mixed with 8.7 grams of 2-amino-2-methyl-1-propanol (95%) and 24.5 grams of deionized water, then added to 346 grams of deionized water. The aqueous acrylic mixture was mixed with 705.6 grams of titanium dioxide and 14.4 grams of carbon black pigment to form a pigment premix. The pigment premix was then ground in a sandmill to produce a pigment paste.

Electrocoat Coating Bath

A bath having a nonvolatile content of 20% and a pigment to binder ratio 1 to 4 was prepared from the following materials.

|  | parts by weight |
| --- | --- |
| Emulsion of Synthesis 1 | 1012.3 |
| Dispersion of Curing Agent | 745.3 |
| Pigment Paste | 214.0 |
| Deionized water | 2028.3 |

Panels were plated from the bath. A panel plated at 175 volts had a filmbuild of 0.9 mils. The electrocoat layer was cured by baking for 30 minutes at 265° F. The cured film was uniform. A panel with a layer of a conductive electrocoat layer was plated at 175 volts and also had a filmbuild of 0.9 mils.

Testing of panels having the cured electrocoat coating of the invention showed that the coating had good corrosion resistance and chip resistance.

What is claimed is:

1. An electrocoat coating composition, comprising, in an aqueous medium, an anionic addition polymer latex and a water-insoluble crosslinking resin dispersed with an anionic dispersing resin.

2. An electrocoat coating composition according to claim 1, wherein the anionic addition polymer comprises a functional group selected from the group consisting of carbamate, urea, hydroxyl, and combinations thereof.

3. An electrocoat coating composition according to claim 1, wherein the anionic addition polymer has an acid equivalent weight of from about 1000 grams per equivalent to about 10,000 grams per equivalent.

4. An electrocoat coating composition according to claim 1, wherein the anionic addition polymer has a hydroxyl equivalent weight of from about 150 grams per equivalent to about 1500 grams per equivalent.

5. An electrocoat coating composition according to claim 1, wherein the anionic addition polymer is polymerized using a chain transfer agent.

6. An electrocoat coating composition according to claim 5, wherein the chain transfer agent is included in an amount of from about 0.8% to about 5%, based on total weight of monomers polymerized.

7. An electrocoat coating composition according to claim 1, wherein the water-insoluble crosslinking resin comprises an aminoplast resin.

8. An electrocoat coating composition according to claim 1, wherein the water-insoluble crosslinking resin comprises an alkylated melamine formaldehyde resin.

9. An electrocoat coating composition according to claim 1, wherein the water-insoluble crosslinking resin comprises a blocked polyisocyanate.

10. An electrocoat coating composition according to claim 1, wherein the anionic dispersing resin is selected from the group consisting of acrylic resins, polyesters, polyurethanes, and combinations thereof.

11. An electrocoat coating composition according to claim 1, wherein the anionic dispersing resin is an acrylic resin having an acid equivalent weight of from about 200 grams per equivalent to about 1000 grams per equivalent.

12. An electrocoat coating composition according to claim 1, wherein the anionic dispersing resin is an acrylic resin having a weight average molecular weight of from about 5000 to about 50,000.

13. An electrocoat coating composition according to claim 1, further including from about 0.1% to about 7% conductive pigment, based on the total weight of nonvolatile material.

14. A method of coating a conductive substrate, including steps of:

(a) immersing a conductive substrate in an electrocoat coating composition comprising, in an aqueous medium, an anionic addition polymer latex and a water-insoluble crosslinking resin dispersed with an anionic dispersing resin;

(b) applying a potential of electric current between a cathode and the conductive substrate to deposit a coating layer onto the conductive substrate; and (c) curing the deposited coating layer.

15. A method according to claim 14, wherein the anionic addition polymer comprises a functional group selected from the group consisting of carbamate, urea, hydroxyl, and combinations thereof.

16. A method according to claim 14, wherein the anionic addition polymer has an acid equivalent weight of from about 1000 grams per equivalent to about 10,000 grams per equivalent.

17. A method according to claim 14, wherein the chain transfer agent is included in an amount of from about 0.8% to about 5%, based on total weight of monomers polymerized.

18. A method according to claim 14, wherein the water-insoluble crosslinking resin comprises an aminoplast resin.

19. A method according to claim 14, wherein the water-insoluble crosslinking resin comprises a blocked polyisocyanate.

20. A method according to claim 14, wherein the anionic dispersing resin is an acrylic resin having an acid equivalent weight of from about 200 grams per equivalent to about 1000 grams per equivalent.

21. A method according to claim 14, wherein the anionic dispersing resin is an acrylic resin having a weight average molecular weight of from about 5000 to about 50,000.

22. A method of coating a conductive substrate, including steps of:

(a) electrocoating the conductive substrate with a first layer of a first electrocoat coating composition containing a conductive pigment;

(b) sufficiently drying or curing the first layer to provide a conductive first layer;

(c) electrocoating the substrate with a second layer from a second electrocoat coating composition; and (d) fully curing the second layer and, if necessary, the first layer, wherein at least one of said first electrocoat coating composition and said second electrocoat coating composition comprises, in an aqueous medium, an anionic addition polymer latex and a water-insoluble crosslinking resin dispersed with an anionic dispersing resin.

23. A method according to claim 22, wherein the first layer is fully cured in step (b).

* * * * *